(12) United States Patent
Stephenson et al.

(10) Patent No.: US 11,448,367 B2
(45) Date of Patent: Sep. 20, 2022

(54) MYCELIUM STORAGE MEDIUM FOR USE IN STORING HYDROGEN

(71) Applicant: The Boeing Company, Chicago, IL (US)

(72) Inventors: Benjamin J. Stephenson, Chicago, IL (US); Jeffrey M. Hansen, Moses Lake, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/218,998

(22) Filed: Mar. 31, 2021

(65) Prior Publication Data

US 2021/0215298 A1    Jul. 15, 2021

Related U.S. Application Data

(62) Division of application No. 15/444,672, filed on Feb. 28, 2017, now Pat. No. 10,995,911.

(51) Int. Cl.
| | |
|---|---|
| *F17C 11/00* | (2006.01) |
| *C01B 3/00* | (2006.01) |
| *F17C 5/06* | (2006.01) |

(52) U.S. Cl.
CPC .......... *F17C 11/005* (2013.01); *C01B 3/001* (2013.01); *F17C 5/06* (2013.01); *F17C 2221/012* (2013.01); *F17C 2227/04* (2013.01); *Y02E 60/32* (2013.01)

(58) Field of Classification Search
CPC .... F17C 11/005; F17C 5/06; F17C 2221/012; F17C 2227/04; C01B 3/001; Y02E 60/32

USPC ......................................................... 220/585
See application file for complete search history.

(56) References Cited

U.S. PATENT DOCUMENTS

| | | |
|---|---|---|
| 4,748,121 A | 5/1988 | Beaver et al. |
| 5,651,976 A | 7/1997 | Price et al. |
| 2006/0163752 A1 | 2/2006 | Wang et al. |
| 2012/0034344 A1 | 2/2012 | Menon et al. |
| 2016/0096164 A1 | 6/2016 | Haaland |
| 2017/0043291 A1 | 2/2017 | Kim et al. |
| 2017/0044011 A1 | 2/2017 | Casellas et al. |
| 2018/0001296 A1 | 1/2018 | Holbrook et al. |
| 2018/0195670 A1 | 7/2018 | Kraus et al. |
| 2018/0221851 A1 | 8/2018 | Petruska et al. |

(Continued)

OTHER PUBLICATIONS

Qajar et al., High pressure hydrogen adsorption apparatus: Design and error analysis, International Journal of Hydrogen Energy, May 2012.

(Continued)

*Primary Examiner* — J. Gregory Pickett
*Assistant Examiner* — Niki M Eloshway
(74) *Attorney, Agent, or Firm* — McDonnell Boehnen Hulbert & Berghoff LLP (57) ABSTRACT

A pressure vessel for storing hydrogen is described. The pressure vessel includes at least one chamber to store hydrogen atoms. The pressure vessel also includes a mycelium structure within the at least one chamber. The mycelium structure has a surface area of at least 800 m²/m³. At least some of the hydrogen atoms are attached to the mycelium structure at a pressure greater than ambient pressure. Methods of storing hydrogen and methods of constructing a hydrogen storage tank are also described.

20 Claims, 6 Drawing Sheets

(56) References Cited

U.S. PATENT DOCUMENTS

2018/0244519 A1  8/2018  Stephenson et al.
2019/0046916 A1  2/2019  Safir et al.

OTHER PUBLICATIONS

Wool et al., Final Report: Chicken Feather Fibers for Hydrogen Storage, https://cfpub.epa.gov/ncer_abstracts/index.cfm/fuseaction/display.highlight/abstract/9002/report/F, Project Period Aug. 15, 2009 through Aug. 14, 2010.

Quick, Darren, Research demonstrates that activated carbon could store hydrogen at room temperature, http://newatlas.com/room-temperature-hydrogen-storage/19894/, Sep. 21, 2011.

MYCELIUM STORAGE MEDIUM FOR USE IN STORING HYDROGEN

CROSS REFERENCE TO RELATED APPLICATION

The present disclosure claims priority to and is a divisional of U.S. application Ser. No. 15/444,672, filed on Feb. 28, 2017, the entirety of which is herein incorporated by reference.

FIELD

The present disclosure relates generally to methods and apparatuses for using mycelium structures to store hydrogen.

BACKGROUND

Hydrogen is useful as an energy source; however, hydrogen storage is difficult and expensive. The amount of hydrogen that can be put in a storage tank is proportional to the amount of surface area of the media inside the tank. Without the use of additional storage materials inside the hydrogen storage apparatus, very little hydrogen can be stored without being highly pressurized or using a very large tank. Hydrogen atoms repel each other and tend to stick (such as a through friction attachment) to surfaces, such as walls of a tank. Thus, in an empty tank, hydrogen will stick to the walls and the interior of the tank will be mostly empty. As such, a gallon of gasoline contains more hydrogen than a gallon of liquid hydrogen because the gasoline hydrocarbons bond with the hydrogen atoms. Highly pressurized tanks are more dangerous and very large tanks are costly and are impractical to be used to transport hydrogen. Current materials used in hydrogen storage tanks include carbon nanotubes and charred chicken feathers. Such materials are not ideal. Carbon nanotubes are expensive. Charred chicken feathers settle over time in the storage apparatus and require extensive filtration for removal from the hydrogen fuel supply.

What are needed are methods and apparatuses for safely storing and transporting hydrogen using a low cost, easy to use, and readily available substance.

SUMMARY

In one example, a pressure vessel for storing hydrogen is described. The pressure vessel comprises at least one chamber to store hydrogen atoms. The pressure vessel further comprises a mycelium structure within the at least one chamber. The mycelium structure has a surface area of at least 800 $m^2/m^3$. At least some of the hydrogen atoms are attached to the mycelium structure at a pressure greater than ambient pressure.

In another example, a method of storing hydrogen is described. The method comprises positioning a mycelium structure into a pressure vessel comprising at least one chamber. The method further comprises filling the pressure vessel with a plurality of hydrogen atoms. At least one of the plurality of hydrogen atoms form an attachment with in the mycelium structure.

In another example, a method of constructing a hydrogen storage tank is described. The method comprises integrating a mycelium structure into a pressure vessel comprising at least one chamber. The method further comprises sealing the pressure vessel. The method also comprises filling the pressure vessel with a plurality of hydrogen atoms. At least one of the plurality of hydrogen atoms form an attachment with the mycelium structure.

The features, functions, and advantages can be achieved independently in various embodiments of the present disclosure or may be combined in yet other embodiments in which further details can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings.

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Figure 1:
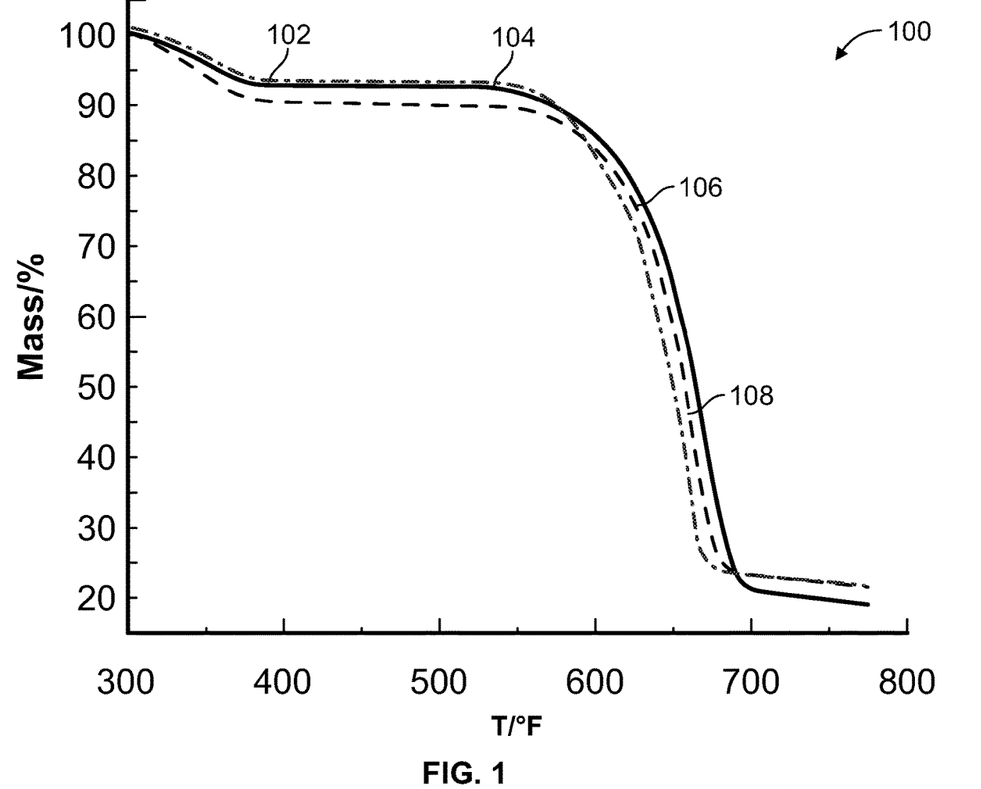
FIG. 1 illustrates a graph of mass of mycelium as a function of temperature, according to an example embodiment.
Figure 2:
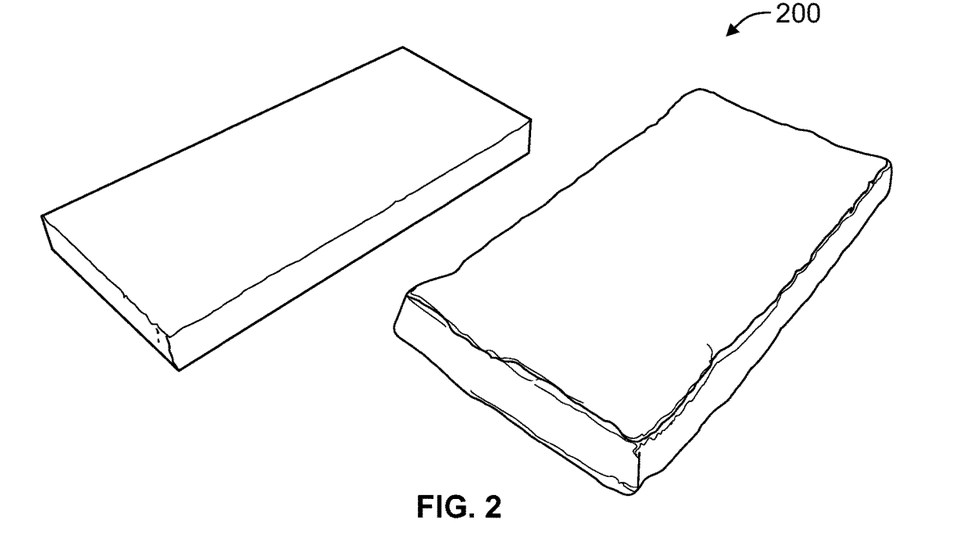
FIG. 2 illustrates example industrial mycelium sheets, according to an example embodiment.

This disclosure seeks to provide a solution to problems that occur when storing hydrogen for use as a fuel source by using mycelium as the storage medium. Mycelium is the vegetative part of a fungus that has a very large surface area. Mycelium is composed of microscopic tubular filaments formed from chitin (a long chain polymer which is a characteristic component of the cell walls of fungi). Chitin is made up of carbon, nitrogen, hydrogen, and oxygen molecules (molecular formula $C_8H_{15}NO_6$). Mycelium (in nature) has a fiber density of about 1 kilometer of mycelium fibers or filaments per cubic centimeter of mycelium media, which results in a large surface area and number of attachment sites for hydrogen. Higher densities may be possible in industrial mycelium. Chitin is stable up to about 600 degrees Fahrenheit, thus the mycelium structure has a long shelf life and can be used under harsh conditions. FIG. 1 illustrates a graph 100 showing pyrolysis of chitin at various temperatures (showing the mass as a percentage of the original mass as a function of temperature). Pyrolization testing starts with at point 102 (about 375 degrees Fahrenheit) after removal of water. At point 104 at about 525 degrees Fahrenheit, the material remains stable. The temperatures between 102 and point 104 may be useful for manufacturing, as such temperatures are easy to reach and the material remains stable between those temperatures. At point 106 at about 630 degrees Fahrenheit, carbon chains in the chitin begin cracking, which may result in removal of some of the carbon and in providing additional surface area for hydrogen atoms to attach or adhere. At point 108 at about 670 degrees Fahrenheit, less than 50 percent of the material remains and the material becomes too fragile to be useful. In addition to being heat stable, the mycelium structure may adhere to the wall of a storage tank, thus the mycelium structure does not settle in the storage tank and does not require excessive filtration from the hydrogen. Mycelium sheets are available for industrial use. Examples of industrial mycelium sheets 200 are shown in FIG. 2. These mycelium sheets 200 may be compressed and/or trimmed to fit into a desired container. In some embodiments, a plurality of mycelium sheets may be used in a single container.

Within examples, a hydrogen storage apparatus is described. The apparatus is a pressure vessel which is useful for safely storing hydrogen using a mycelium structure. In some embodiments, the pressure vessel comprising a mycelium structure has the potential to store up to eighty times more hydrogen than the same sized pressure vessel without the mycelium structure. In addition, methods of storing hydrogen and methods of constructing a hydrogen storage tank are described.

Figure 3:
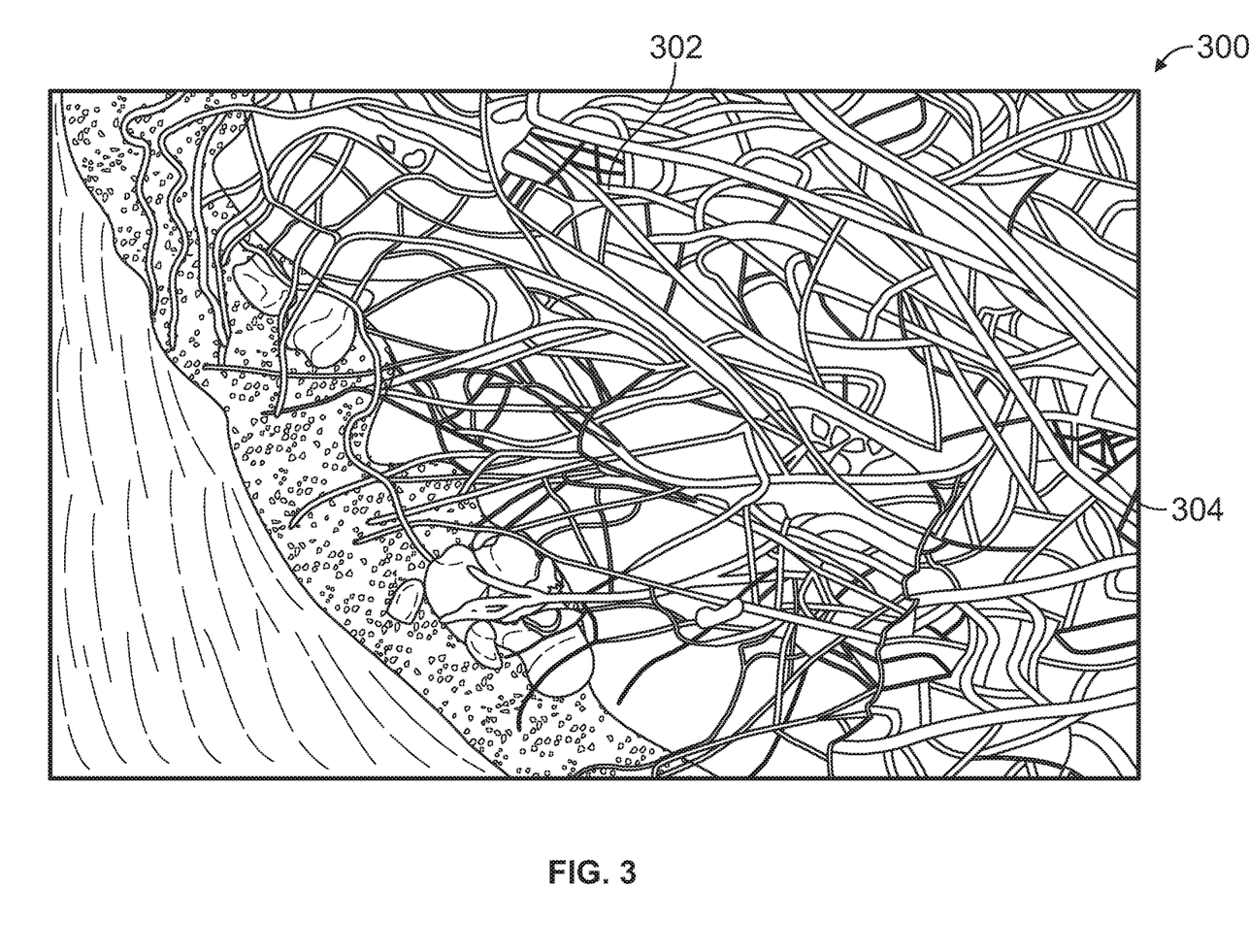
FIG. 3 illustrates an example mycelium structure, according to an example embodiment.

Referring now to FIG. 3, an example mycelium structure 300 is illustrated. As discussed above, mycelium has a fiber density of about 1 kilometer of mycelium fibers or filaments per cubic centimeter of mycelium media. The mycelium structure includes tubular filaments 302, which form respiration pathways 304. Respiration pathways 304 allow hydrogen atoms to travel within the mycelium structure 300. The sizes of the tubular filaments 302 and the respiration pathways 304 may be dependent on a variety of factors, such as the strain of mycelium, the age of the mycelium structure, the environment in which the mycelium structure was grown (e.g., temperature, pressure, etc.), and the nutrient source used to grown the mycelium structure. In some embodiments, the respiration pathways 304 may have a diameter of between about 7 microns and about 20 microns. Hydrogen atoms prefer the smaller diameter pathways (around 7 microns) because the hydrogen atoms are able to be closer to the pathways for easier attachment. However, the larger diameter pathways (about 20 microns) provide for more surface area and thus more attachment sites. Respiration pathways above about 20 microns do not provide a dense enough mycelium structure for use in hydrogen storage. The mycelium structure does not have a measurable porosity/void fraction because the mycelium structure is a series of pathways arranged in random order. Mycelium structures used for hydrogen storage are dead (i.e., no longer growing), but because they were once alive, their respiration pathways are in a random and intertwined order, unlike those of carbon nanotubes. The mycelium structures also have a different pattern than charred chicken feathers, as the mycelium structures and chicken feathers are initially grown for different purposes. Furthermore, they mycelium structure is compressed into a nearly solid material with small respiration pathways, as discussed above.

Figure 4:
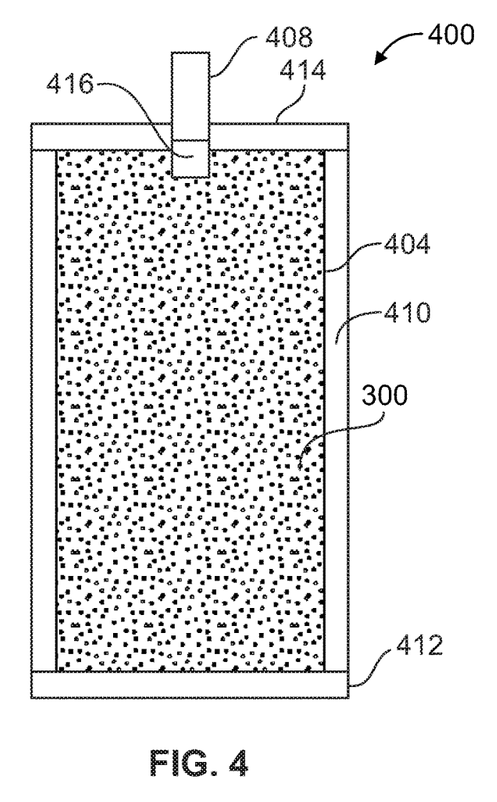
FIG. 4 illustrates an example pressure vessel for hydrogen storage with a single inlet/outlet, according to an example embodiment.

FIG. 4 illustrates a pressure vessel 400 for storing hydrogen. The pressure vessel 400 comprises at least one chamber 404 configured to store hydrogen atoms. The pressure vessel 400 can be any conventional pressure vessel known in the art, such as a cylindrical pressure vessel. The pressure vessel can also be of a customizable shape in order to fit on a vehicle for transportation. In some embodiments, the pressure vessel 400 is of a size that can be fit on a vehicle for transportation, such as a truck, train, aircraft, ship, or other automobile. In such embodiments, the ability to store hydrogen at lower pressures than conventional high pressure vessels is important because such customizable pressure vessels may not be an ideal pressure vessel. In other embodiments, the pressure vessel 400 is larger in order to allow for additional storage, such as for storage of hydrogen for use in a power plant. The material from which the pressure vessel is made may also be application specific. For example, graphite composite material or Kevlar wound or fiber glass may be used for light-weight pressure vessels. For more robust pressure vessels, metals such as aluminum and steel may be used.

The pressure vessel may be configured to store the hydrogen atoms at relatively low pressures compared to current high pressure vessels. The hydrogen atoms may be stored at a pressure of less than about 300 psi. In some embodiments, the hydrogen atoms may be stored at a pressure of less than about 200 psi. In other embodiments, the hydrogen atoms may be stored at a pressure of less than about 100 psi. In other embodiments, the hydrogen atoms may be stored at a pressure of between about 200 psi and about 300 psi or between about 100 psi and about 200 psi or between about 100 psi and about 300 psi. In other embodiments, the hydrogen atoms may be stored at high pressures, for example, at a pressure of greater than about 5000 psi. However, vessels capable of storing hydrogen at high pressures are more expensive to make than low pressure vessels. In addition, it takes more energy to increase the pressure and compress the gas. By using the term "about" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The at least one chamber 404 within the pressure vessel 400 includes the mycelium structure 300. The pressure vessel 400 may also comprise at least one inlet/outlet 408, a chamber wall 410, a bottom portion 412, and a top portion 414. In some embodiments, at least a portion of the pressure vessel may be metalized, such that hydrogen is unable to pass. For example, the chamber wall 410 may be metalized, for example, the chamber walls 410 may be coated with a steel/metallic or aluminum coating. In some embodiments, the pressure vessel 400 may further comprise a safety or relief valve (not shown) to ensure that this pressure is not exceeded in operation.

The at least one inlet/outlet 408 may be used for filling the pressure vessel with hydrogen and/or removing hydrogen from the pressure vessel. In the embodiment illustrated in FIG. 4, the inlet and the outlet may be the same element. In other embodiments, the inlet and outlet may be separate elements (see FIG. 5). The at least one inlet/outlet may include an inhibitor 416 for confining the mycelium structure within the pressure vessel and allowing for passage of the hydrogen atoms.

They mycelium structure 300 in the chamber 404 has a surface area of at least about 8000 $m^2/m^3$. In some embodiments, the mycelium structure 300 may have a surface are of at least about 20,000 $m^2/m^3$. In other embodiments, the mycelium structure 300 may have a surface area of at least about 50,000 $m^2/m^3$. In other embodiments, the mycelium structure 300 may have a surface are of between about 8000 $m^2/m^3$ and about 50,000 $m^2/m^3$ or between about 25,000 $m^2/m^3$ and about 75,000 $m^2/m^3$. In an example embodiment, use of the mycelium structure 300 has about 80 times more surface area than the same tank without the mycelium structure. For example, a tank with 6 1-centimeter walls has a surface area of 6 $cm^2/cm^3$. The same tank with a mycelium structure has a surface area of about 478 $cm^2/cm^3$ (about 47,800 $m^2/m^3$).

Gas adsorption refers to the adhesion or attachment of gas molecules to solid surfaces. Hydrogen atoms repel generally each other and tend to adhere or attach to surfaces, such as walls of a tank. Thus, the large surface area of the mycelium structure 300 provides an increased number of attachment points for the hydrogen atoms as compared to an empty tank and thus, increased hydrogen adsorption. At least some of the hydrogen atoms are attached to the mycelium structure 300 at a pressure greater than ambient pressure. In addition, the mycelium structure 300 includes carbon atoms. At least some of the carbon atoms may bond with at least some of the hydrogen atoms. The carbon-hydrogen bond is a covalent bond, meaning that a single carbon atom shares its outer electrons with up to four hydrogen atoms. By providing carbon attachment and carbon bonding sites, the hydrogen atoms are brought closer together, thus allowing for more hydrogen to be stored within the same volume. Without the carbon attachment and carbon bonding sites, the hydrogen atoms tend to repel each other, resulting in fewer hydrogen atoms able to be stored within the pressure vessel.

Figure 5:
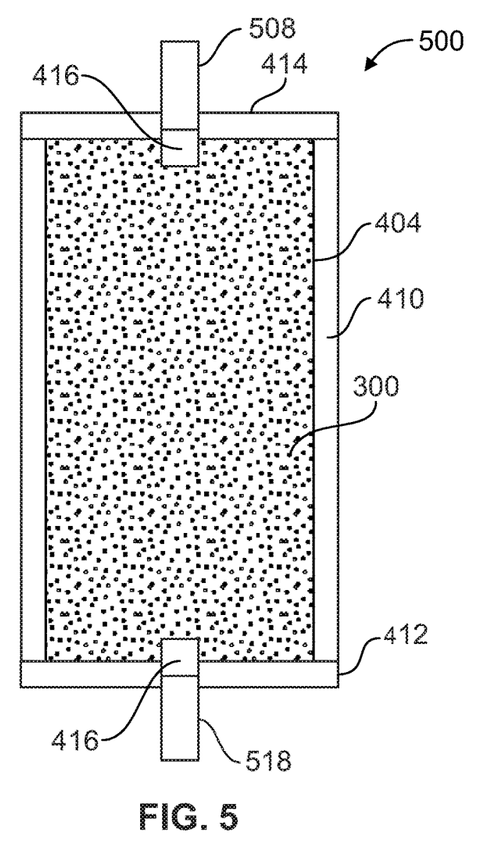
FIG. 5 illustrates an example pressure vessel for hydrogen storage with a separate inlet and outlet, according to an example embodiment.

FIG. 5 illustrates a pressure vessel 500 for storing hydrogen comprising an inlet 508 for filling the chamber 404 with hydrogen and an outlet 518 for removing hydrogen from the chamber 404 for use. Hydrogen is injected into the chamber 404 through inlet 508. As the hydrogen is injected, it travels through the respiratory pathways in the mycelium structure 300 and attaches to the mycelium structure 300. Hydrogen is removed from the chamber 404 by opening the outlet 518 to relieve the pressure in the pressure vessel 500. Because the hydrogen is stored at a relatively low pressure compared to conventional hydrogen storage tanks, the hydrogen slowly exits the tank when the outlet 518 is opened. In alternative embodiments, a pressure vessel may comprise a plurality of inlets 508 and a plurality of outlets 518.

Figure 6:
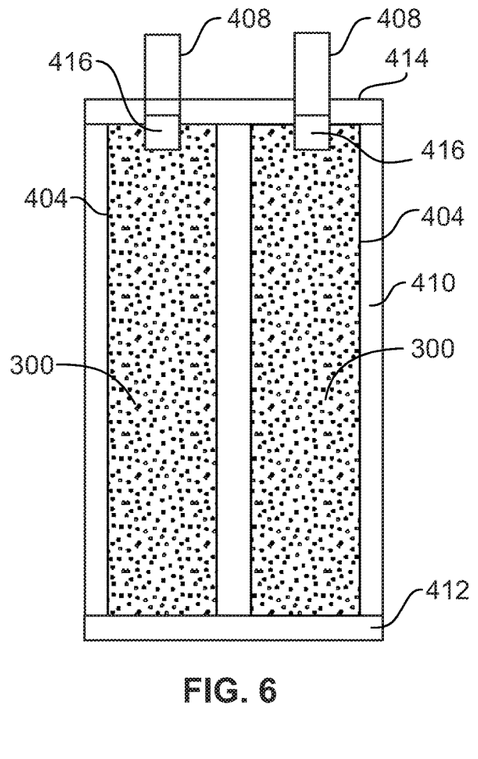
FIG. 6 illustrates an example pressure vessel for hydrogen storage with two chambers, according to an example embodiment.

FIG. 6 illustrates a pressure vessel 600 comprising a plurality of chambers 404. Each of the plurality of chambers 404 may include a mycelium structure, such as mycelium structure 300. Each of the plurality of chambers 404 includes at least one inlet/outlet 408.

Figure 7:
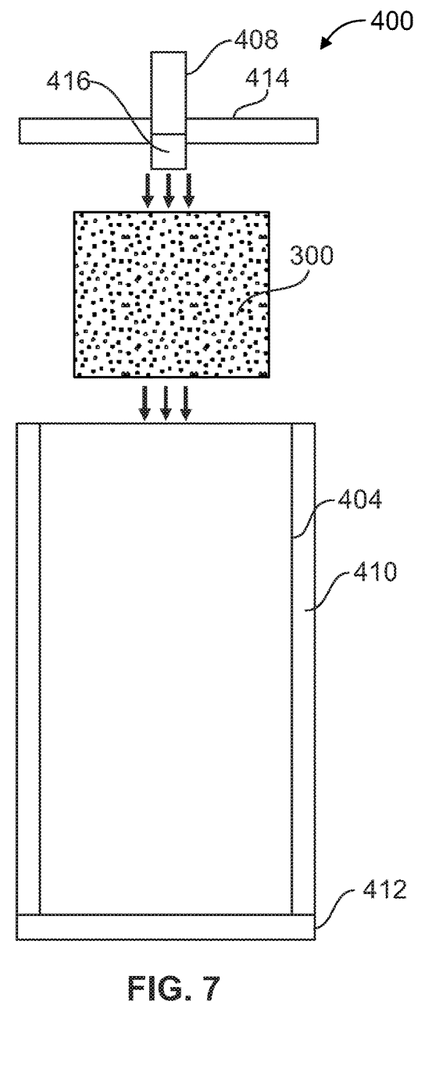
FIG. 7 illustrates the pressure vessel prior to positioning the mycelium structure in the pressure vessel, according to an example embodiment.

FIG. 7 illustrates the pressure vessel 400 prior to integrating the mycelium structure 300 into the pressure vessel. The mycelium structure 300 may be compressed such that it can easily fit into the chamber 404. Once the mycelium structure 300 is inserted into the chamber 404, it may expand to fill the chamber 404. The mycelium structure 300 may not expand at all or may not expand back to its original size and thus may be compressed within the pressure vessel 400. In some embodiments, the compression ratio is 10 to 1, which increases the density of the mycelium structure by a factor of 10. Compressing the mycelium structure reduces the number of voids in the mycelium structure. Compression may also decrease the size of the respiration pathways slightly, but the primary result of compression is removal of voids. The mycelium structure 300 may have a compression ratio of 10 to 1. In some embodiments, the mycelium structure 300 may be compressed such that it can fit through an orifice smaller than a width of the chamber 404. Compression of the mycelium structure allows for more mycelium fibers or filaments in the pressure vessel and thus a greater surface area to allow for an increased number of hydrogen attachment locations (as compared to a non-compressed mycelium structure). In some embodiments, the mycelium structure 300 comprises a plurality of mycelium sheets in order to fill the pressure vessel. After the mycelium structure is positioned into the chamber 404, the pressure vessel 400 may be sealed by placing the top portion 414 on the chamber walls 410 and sealing with Teflon O rings between bolted flanges or threading the top portion 414 onto the chamber walls 410.

Figure 8:
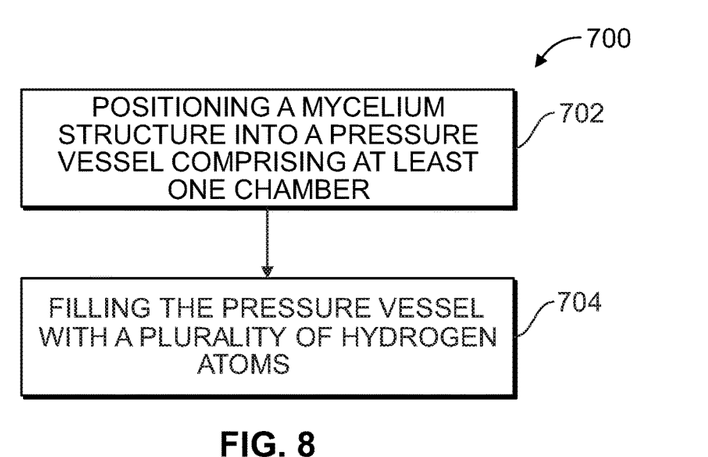
FIG. 8 shows a flowchart of an example method for storing hydrogen, according to an example embodiment.

FIG. 8 shows a flowchart of an example method 700 for storing hydrogen. At block 702, the method 700 includes positioning the mycelium structure 300 into a pressure vessel, such as pressure vessel 400 comprising at least one chamber 404. The mycelium structure 300 may be positioned into the pressure vessel 400 manually or by a machine. The method 700 may also be used with other embodiments, such as with pressure vessels 500 and 600. At block 704, the method includes filling the pressure vessel 400 with a plurality of hydrogen atoms. The pressure vessel 400 may be filled manually or by a machine by any method known in the art, for example, by connecting a hydrogen reservoir to the pressure vessel and pumping hydrogen into the pressure vessel. The method may also comprise incorporating the pressure vessel 400 into a vehicle for transportation, such as a truck or a train. The hydrogen storage apparatus can be incorporated into any setting (not just transportation related). It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

Figure 9:
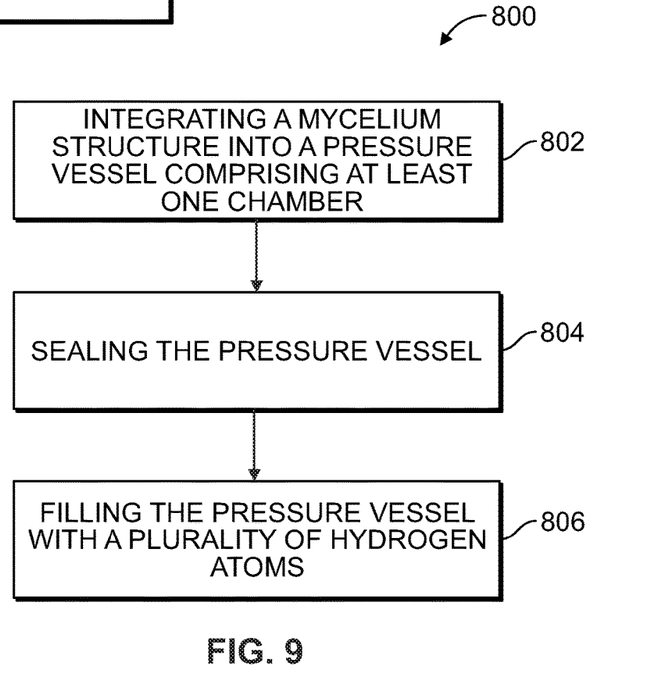
FIG. 9 shows a flowchart of an example method of constructing a hydrogen storage tank, according to an example embodiment.

FIG. 9 shows a flowchart of an example method 800 of constructing a hydrogen storage tank. At block 802, the method 800 includes integrating a mycelium structure, such as mycelium structure 300, into a pressure vessel, such as pressure vessel 400. The mycelium structure 300 may be integrated into the pressure vessel 400 manually or by a machine. The method 800 may also be used with other embodiments, such as with pressure vessels 500 and 600. At block 804, the method 800 includes sealing the pressure vessel 400. The pressure vessel 400 may be sealed manually or by a machine. For example, the pressure vessel 400 may be sealed with Teflon O rings between bolted flanges. In other embodiments, the chamber walls 410 may comprise external threads (not shown) and the top portion 414 of the pressure vessel 400 may comprise internal threads (not shown). The pressure vessel 400 may be sealed by engaging the threads of the chamber walls 410 and the top portion 414 (i.e., by winding or screwing the top portion 414 onto the chamber walls 410). In other embodiments, the pressure vessel 400 may be a unitary pressure vessel (i.e., formed from a single composite part) and may be sealed by closing the inlet 408. At block 806, the method 800 includes filling the pressure vessel with a plurality of hydrogen atoms. The pressure vessel 400 may be filled manually or by a machine. The pressure vessel 400 may be filled with hydrogen by connecting the pressure vessel 400 to a reservoir of hydrogen and pumping hydrogen into the pressure vessel 400. The amount of hydrogen to be pumped into the pressure vessel can be determined by comparing the pressures of equal volume vessels with and without a mycelium structure, as discussed in connection with FIG. 11 below. The difference between the pressures in the vessels is used in order to calculate the amount of hydrogen that will fit in the pressure vessel including the mycelium structure. In some embodiments, chamber walls 410 may be positioned on the bottom portion 412 of the pressure vessel 400 and the chamber walls 410 may be connected to the bottom portion 412 by engaging threads of chamber walls 410 with threads of bottom portion 412. The mycelium structure 300 may then be integrated into the vessel portion. Next, the pressure vessel 400 may be sealed by positioning top portion 414 on top of the chamber walls 410 and sealing with Teflon O rings between bolted flanges or engaging the threads of the chamber walls 410 and the top portion 414.

Figure 10:
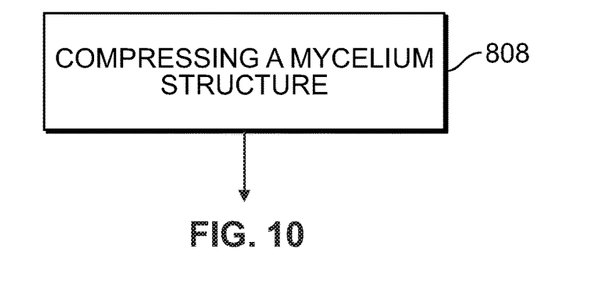
FIG. 10 shows a flowchart of an example method for use with the method shown in FIG. 9, according to an example embodiment.

FIG. 10 shows a flowchart of an example method for use with the method 800, according to an example embodiment. At block 808, the method includes compressing the mycelium structure 300 prior to integrating the mycelium structure 300 into the pressure vessel 400. The mycelium structure 300 may be compressed manually or by a machine. The mycelium structure 300 may then expand after being integrated into the pressure vessel 400 in order to fill the chamber 404.

In some embodiments, the mycelium structure 300 is a pre-manufactured mycelium structure such as mycelium sheet 200 in FIG. 2 and such structure is integrated into the pressure vessel. The pre-manufactured mycelium structure may be trimmed or otherwise reshaped to conform the mycelium structure to a shape of the at least one container. In some embodiments, a plurality of mycelium sheets 200 may be used to fill the container. The pre-manufactured mycelium structure is dead, thus it does not grow within the pressure vessel.

In other embodiments, the step of integrating the mycelium structure into the pressure vessel comprises causing growth of the mycelium structure within the pressure vessel. Mycelium can be grown in the pressure vessel by placing mycelium spores, a nutrient source such as light corn syrup, honey, corn sugar, light malt extract, and/or dextrose, and water within the pressure vessel. Once the mycelium structure reaches a desired size, growth is stopped by heating to above about 125 degrees Fahrenheit (dependent on the strain of mycelium).

Figure 11:
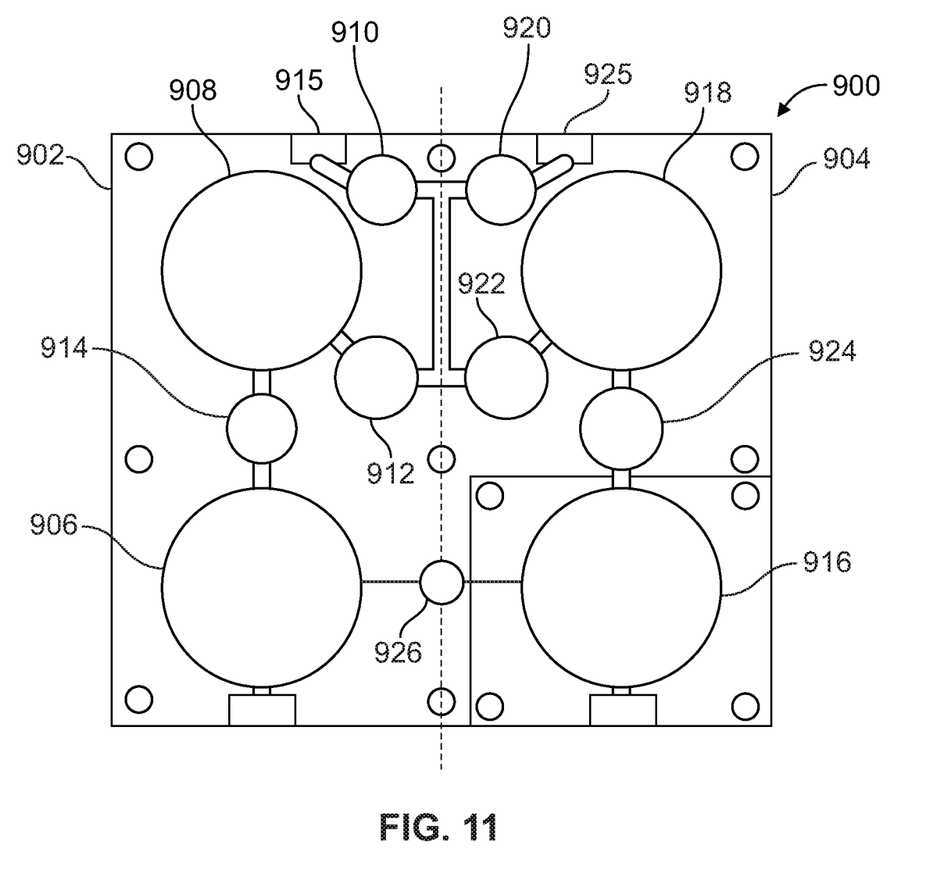
FIG. 11 shows an example testing apparatus for comparing adsorption rates of tank media/mycelium according to an example embodiment.

FIG. 11 shows an example testing apparatus 900 for comparing adsorption rates within two tanks. The testing apparatus 900 may comprise a monolithic block with two parallel circuits—a first circuit 902 and a second circuit 904. The first circuit 902 may comprise a first tank 906 without a mycelium structure, a second tank 908, a plurality of vessels 910, 912, and 914, and vacuum point 915. The second circuit 904 may comprise a first tank 916 including a mycelium structure, such as mycelium structure 300, a second tank 918, a plurality of vessels 920, 922, and 924, and a gas inlet point 925. The volumes of first tank 906 without the mycelium structure and the first tank 916 with the mycelium structure are the same. The temperatures within the first circuit 902 and the second circuit 904 are also the same. In order to use the testing apparatus 900, the contents of the vessels 910, 912, 914, 920, 922, and 924 are evacuated through the vacuum point 915. Next, the tanks and vessels within the first circuit 902 and the second circuit 904 are filled through gas inlet point 925 with a predetermined amount of hydrogen. Valves such as solenoid valves may be used for the vacuum point 915 and the gas inlet point 925 to prevent leakage of hydrogen from the circuits 902 and 904. The circuits 902 and 904 are allowed to stabilize and the pressures within the first tank 906 and the first tank 916 are measured and compared with a differential pressure gauge 926. The pressure differential between the tanks 906 and 916 is used to determine the amount of hydrogen in each tank 906 and 916. The amount of hydrogen in each tank is inversely related to the pressure in each tank. Because the pressure in the first tank 916 containing the mycelium structure is less than the pressure in the first tank 906, the amount of hydrogen absorbed in the first tank 916 is greater than the amount of absorbed hydrogen in the first tank 906. This increase in the amount of hydrogen absorbed is due to the presence of the mycelium structure with its large surface area providing attachment points for the hydrogen atoms and the bonding of the hydrogen atoms to the carbon atoms in the mycelium structure. The apparatus 900 can be used to determine the maximum amount of hydrogen that can be filled into a storage tank.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A method of constructing a hydrogen storage tank, comprising:
   compressing a mycelium structure;
   after compressing the mycelium structure, integrating the mycelium structure into a pressure vessel comprising at least one chamber, wherein the mycelium structure expands after being integrated into the pressure vessel;
   sealing the pressure vessel; and
   filling the pressure vessel with a plurality of hydrogen atoms,
   wherein at least one of the plurality of hydrogen atoms form an attachment with the mycelium structure.

2. The method of claim 1, wherein compressing the mycelium structure comprises compressing the mycelium structure so that a density of the mycelium structure is increased by a factor of 10.

3. The method of claim 1, wherein integrating the mycelium structure into the pressure vessel comprises causing growth of the mycelium structure within the pressure vessel.

4. The method of claim 3, wherein causing growth of the mycelium structure within the pressure vessel comprises:

placing mycelium spores, a nutrient source, and water within the pressure vessel.

5. The method of claim 4, further comprising once the mycelium structure reaches a desired size, stopping growth by heating to above about 125 degrees Fahrenheit.

6. The method of claim 1, wherein integrating the mycelium structure into the pressure vessel comprises conforming the mycelium structure to a shape of the at least one chamber.

7. The method of claim 1, wherein integrating the mycelium structure into the pressure vessel comprises integrating the mycelium structure having a surface area of at least 800 $m^2/m^3$.

8. The method of claim 1, further comprising filling the pressure vessel with the plurality of hydrogen atoms through at least one inlet.

9. The method of claim 8, wherein the pressure vessel comprises an outlet for removing hydrogen from the pressure vessel, and wherein the at least one inlet and the outlet are the same element.

10. The method of claim 9, wherein the at least one inlet or the outlet comprise an inhibitor for confining the mycelium structure within the pressure vessel and allowing for passage of the plurality of hydrogen atoms.

11. The method of claim 1, wherein integrating the mycelium structure into the pressure vessel comprises integrating the mycelium structure having a plurality of pathways.

12. The method of claim 1, wherein integrating the mycelium structure into the pressure vessel comprises integrating a plurality of mycelium sheets.

13. The method of claim 1, wherein the pressure vessel comprises a plurality of chambers, and wherein integrating the mycelium structure into the pressure vessel comprises integrating the mycelium structure into each of a plurality of chambers.

14. The method of claim 1, wherein at least some of the plurality of hydrogen atoms form an attachment with the mycelium structure at a pressure greater than ambient pressure.

15. The method of claim 1, wherein at least a portion of the pressure vessel is metalized.

16. The method of claim 1, wherein filling the pressure vessel with the plurality of hydrogen atoms comprises filling the pressure vessel with the plurality of hydrogen atoms at a pressure of less than about 300 psi.

17. The method of claim 1, further comprising determining an amount of the plurality of hydrogen atoms to fill the pressure vessel by:
  comparing first and second pressures of equal volume first and second pressure vessels, wherein the first pressure vessel includes the mycelium structure and the second pressure vessel is empty; and
  calculating the amount of the plurality of hydrogen atoms that will fit in the first pressure vessel including the mycelium structure based on a difference between the first and second pressures.

18. The method of claim 1, further comprising incorporating the pressure vessel into a vehicle for transportation.

19. The method of claim 1, wherein integrating the mycelium structure into the pressure vessel comprises integrating the mycelium structure comprising microscopic tubular filaments formed from chitin.

20. A method of constructing a hydrogen storage tank, comprising:
  integrating a mycelium structure into a pressure vessel comprising at least one chamber, wherein integrating the mycelium structure into the pressure vessel comprises integrating a plurality of mycelium sheets;
  sealing the pressure vessel; and
  filling the pressure vessel with a plurality of hydrogen atoms,
  wherein at least one of the plurality of hydrogen atoms form an attachment with the mycelium structure.

* * * * *